United States Patent Office 3,432,582
Patented Mar. 11, 1969

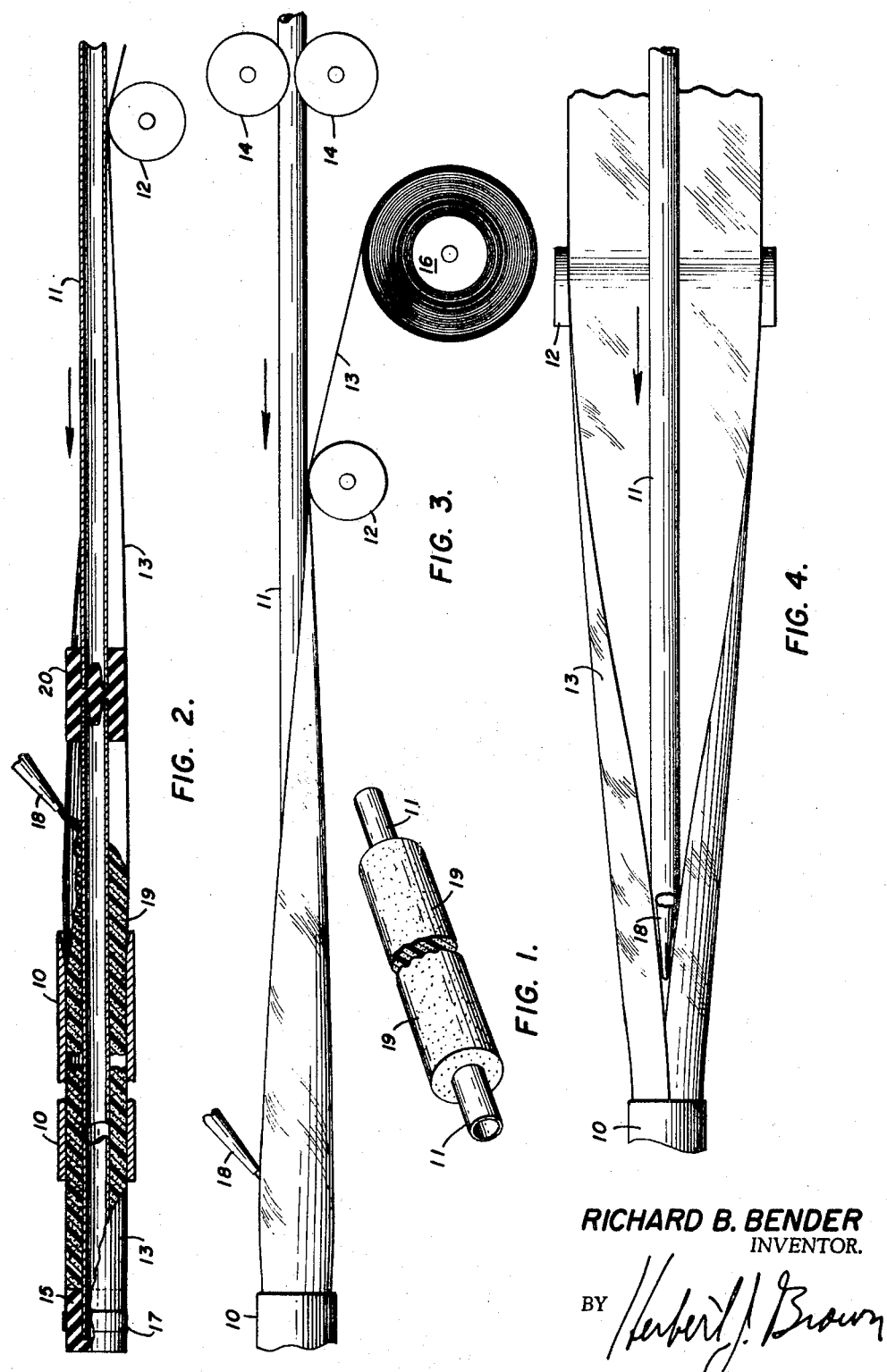

3,432,582
APPARATUS AND METHOD FOR COATING PIPE
Richard B. Bender, P.O. Box 11302,
Fort Worth, Tex. 76109
Filed July 20, 1966, Ser. No. 566,608
U.S. Cl. 264—47
Int. Cl. B29h 9/00
4 Claims

ABSTRACT OF THE DISCLOSURE

Apparatus and a method of coating pipe with a synthetic foam resin including a tubular die and a length of film positioned to receive the pipe to be coated and the said film, and means applying resin foam around the pipe and in the film as they pass through the die. A preferred form of the invention includes a follower receiving ends of lengths of pipe whereby the coating operation may be continuous.

---

This invention relates to apparatus and a method for applying insulating coating to pipe and has reference to my copending application, Ser. No. 528,659, filed Oct. 18, 1965, now United States Patent No. 3,359,351 which issued December 19, 1967.

The referred to copending application has to do with coating lengths of pipe with synthetic resin foam wherein the length of pipe to be coated is supported in a longitudinally separable cylindrical mold and wherein the foam is caused to expand in the mold and around the pipe. While this means and method have proven to be commercially practical, it is somewhat slow in its operation.

The primary object of the present invention is to provide a method for faster application of foam resin coating around lengths of pipe.

Another object is to provide means whereby lengths of pipe, one after the other, may be coated with synthetic resin foam as a continuous process.

A further object is to provide means, in a continuous process as last referred to, whereby the ends of the pipe are exposed for subsequent coupling.

These and other objects of the invention will become apparent from the following description and the accompanying drawing, in which:

FIGURE 1 is a broken perspective view of a length of pipe coated with foam as the result of the present method.

FIGURE 2 is a longitudinal vertical sectional schematic view, shown partly in elevation, of a portion of the apparatus illustrated in FIGURE 3 and additionally showing means for covering and subsequently exposing the ends of the coated pipe.

FIGURE 3 is a broken elevational schematic view of apparatus for carrying out the present method, and FIGURE 4 is a broken plan view of the pipe to be coated, the tubular die, film and film guide roller first shown in FIGURES 2 and 3.

Generally, the apparatus of the invention is comprised of a horizontal tubular die 10 which receives the lengths of pipe 11 to be coated, a transverse cylindrical film guide roller 12 upstream of the die and beneath the pipe, and a length of film 13 extending from the film guide roller into and around the receiving opening of the die. The pipe 11 is fed into the die 10 by a pair of feed rollers 14, one or both of which may be driven.

The first end of the first length of pipe 11 to be received in the die 10 is received in a cylindrical resilient cap 15 of a diameter which is a sliding fit in the die. In the appended claims, the cap 15 is referred to as a lead cylindrical support. Before inserting the cap 15 in the die 10, the free end of the film 13, which is rolled on a spool 16 upstream of the die 10 and passes over the guide roller 12, is secured around the cap by a length of adhesive tape 17.

Thus, the length of film 13 between the guide roller 12 and the die 10 changes from flat to round when entering the die. That length of film 13 between the guide roller 12 and the die 10 may be referred to as trough shaped.

A downwardly directed nozzle 18 is positioned above the trough shaped portion of the film 13 just upstream of where the edges of the film converge before entering the die 10. The nozzle 18 is a part of a mixing spray gun, not shown, which generates and expels synthetic resin foam, for example urethane, in liquid form before the foam has fully expanded. The numeral 19 refers to both the liquid foam and the expanded hardened foam which is the product of the invention.

As shown only in FIGURE 2, the lengths of pipe 11 to be coated are connected in axial alignment by cylindrical resilient couplers 20, each of which has an axial opening, not numbered, to receive the ends of the pipe 11. The couplers 20 are referred to as follower cylindrical supports in the appended claims. As will become apparent, the end portions of the pipe 11 received in the couplers 20 are not coated with the foam 19, but are exposed for subsequent connection at the time of installation.

In operation, the cap 15 is placed on the end of the first length of pipe 11 to be coated and the extending end of the film 13 from the guide roller 12 is secured therearound in the manner described. The cap 15 and the end of the pipe 11 are then placed in the receiving opening of the die 10. Not shown, the outer surface of the trough shaped portion of the film 13 may be slidably supported by suitable means, for example, conformingly shaped sheet metal. The cap 15 and pipe 11 are then moved through the die 10 by the feed rollers 14, and at the same time foam 19 is ejected from the nozzle 18. The foam 19 expands and hardens in the tube of film 13 within the die 10. Additional lengths of pipe are connected by the couplers 20 and thus the process may be continuous.

By way of example, the foam 19 herein referred to may be urethane and the film 13 may be polyethylene which is inexpensive and may be readily removed from the hardened urethane foam after the pipe length 11 passes through the die 10.

What is claimed is:
1. The method of coating lengths of pipe with synthetic resin foam comprising the steps of: axially supporting one end of a length of pipe to be coated in a lead cylindrical support in the receiving end of a tubular die, positioning one end of a length of film around the inside of the referred to receiving opening of said tubular die, providing a follower on the remaining end of said length of pipe and of a size and shape to receive the end of an additional length of pipe and to pass through said die, injecting foam against the inner surface of said film adjacent said die, and moving said pipe, said film and the foam therein through said die.

2. The method defined in claim 1 and wherein said foam is urethane and said film is polyethylene.

3. The method defined in claim 1 and including the step of forming said film substantially in the shape of a trough just prior to its entering said die.

4. Apparatus for applying a coating of synthetic resin foam around a length of pipe, said apparatus comprising: a tubular die having a receiving end and discharge end, a lead cylindrical support slidably received in said tubular die and having an axial support positioned to receive an end of the length of pipe to be coated, a follower cylindrical support of a diameter adapted to be slidably received in said tubular die, said follower cylindrical support having an axial opening in the end thereof to receive the remaining end of said length of pipe, a transverse film guide spaced from the receiving end of said tubular die, a length of film positioned over said film guide, means adapted to apply resin foam around said pipe, and means adapted to feed said film and said pipe through said die.

References Cited

UNITED STATES PATENTS

| | | | |
|---|---|---|---|
| 3,118,800 | 1/1964 | Snelling | 264—47 XR |
| 3,144,369 | 8/1964 | Foord et al. | 264—47 XR |
| 3,309,458 | 3/1967 | Yoshimura et al. | 264—47 XR |
| 3,366,719 | 1/1968 | Lueders | 264—47 |

FOREIGN PATENTS

| | | |
|---|---|---|
| 965,185 | 7/1964 | Great Britain. |
| 1,047,150 | 11/1966 | Great Britain. |
| 1,364,174 | 5/1964 | France. |

PHILIP E. ANDERSON, *Primary Examiner.*

U.S. Cl. X.R.

18—4, 5; 138—151; 264—267